United States Patent
Aizawa

(10) Patent No.: US 7,382,475 B2
(45) Date of Patent: Jun. 3, 2008

(54) PRINTER, INFORMATION PROCESSING APPARATUS, AND CONTROL METHOD OF INTERFACE

(75) Inventor: Takayuki Aizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 10/435,083

(22) Filed: May 12, 2003

(65) Prior Publication Data
US 2003/0210418 A1    Nov. 13, 2003

(30) Foreign Application Priority Data
May 13, 2002   (JP)   ............................. 2002-136388

(51) Int. Cl.
*G06F 15/00*   (2006.01)
*G06K 1/00*   (2006.01)
(52) U.S. Cl. .................. 358/1.14; 358/1.15; 358/1.9; 710/15; 710/58; 399/80
(58) Field of Classification Search .............. 358/1.15, 358/1.6, 1.9, 1.14; 710/72, 14, 15, 58; 399/80
See application file for complete search history.

(56) References Cited

U.S. PATENT DOCUMENTS

| | | | | |
|---|---|---|---|---|
| 6,434,643 | B1 * | 8/2002 | Ejiri | 710/58 |
| 6,473,811 | B1 * | 10/2002 | Onsen | 710/15 |
| 6,549,958 | B1 * | 4/2003 | Kuba | 710/14 |
| 6,594,031 | B1 * | 7/2003 | Taima | 358/1.15 |
| 6,665,094 | B1 * | 12/2003 | Lapstun | 358/1.9 |
| 6,947,171 | B1 * | 9/2005 | Narusawa et al. | 358/1.6 |
| 6,957,287 | B2 * | 10/2005 | Lou et al. | 710/72 |
| 7,057,754 | B1 * | 6/2006 | Tsuchiya et al. | 358/1.15 |
| 7,113,720 | B2 * | 9/2006 | Hirano | 399/80 |
| 7,218,415 | B2 * | 5/2007 | Lapstun et al. | 358/1.9 |
| 7,268,900 | B1 * | 9/2007 | Zimmerman | 358/1.15 |

* cited by examiner

*Primary Examiner*—Douglas Q. Tran
*Assistant Examiner*—Satwant Singh
(74) *Attorney, Agent, or Firm*—Fitzpatrick, Cella, Harper & Scinto

(57) ABSTRACT

When it is detected that a USB cable has been connected, a status of a function is discriminated. If there is no problem even if a USB enumeration is started, a USB signal is pulled up and the enumeration is started. If it is determined that trouble occurs as a function when the enumeration is started, the pull-up of the USB signal is extended and, after the trouble is solved, the USB signal is pulled up and the enumeration is started.

5 Claims, 4 Drawing Sheets

PRINTER, INFORMATION PROCESSING APPARATUS, AND CONTROL METHOD OF INTERFACE

BACKGROUND OF THE INVENTION

1. Field of the Invention

The invention relates to a printer having a USB interface and at least an interface other than the USB interface.

2. Related Background Art

The Universal Serial Bus (USB) interface which has formally been supported since Windows (registered trademark) 98 is a new interface which is substituted for conventional IEEE1284. The USB interface has the following features.

1) Devices having various functions can be connected. (IEEE1284 is originally an interface only for use for printers.)
2) "Plug & Play" is possible.
3) Up to 127 apparatuses can be connected via a hub. And the like.

To realize "Plug & Play", in the USB, the device has a bus termination as shown in FIG. 3.

In FIG. 3, reference numeral 300 denotes a host side and 301 indicates a function. The termination on the host 300 side has been pulled down and one of signals on the function 301 side has been pulled up. In the case of the USB fast speed function, D+ has been pulled up. In the case of the USB slow speed function, D− has been pulled up. (Note: In the USB, there are two transfer speeds of 12 Mbits and 1.5 Mbits. The function for performing the 12-Mbit transfer is called a fast speed function and the function for performing the 1.5-Mbit transfer is called a slow speed function. In the USB, the host and hub have to be able to support both of the fast speed transfer and the slow speed transfer.) Therefore, if the host 300 and the function 301 are connected by a USB cable and a power source of the function 301 is turned on, since the signal D+ or D− is pulled up, one of the signal D+ and D− on the host side is set to the high level. The host 300 detects that D+ or D− of the USB data signal has been set to the high level, thereby recognizing that the USB function has physically been connected. When the host 300 confirms that the function 301 has been connected, the host issues a command to confirm what the connected function is. When the function 301 receives the command from the host 300, the function 301 returns information of a device class or a device model name or the information of the device class and the device model name to the host 300. For example, if the function 301 is a printer, the host recognizes that the function 301 belongs to the class of the printer from the received information of the device class or the received information of the device model name and issues a command of the printer class.

If the function 301 belongs to the class of a pointing device (human interface device), the host recognizes that the function 301 is the class of the pointing device (human interface device) from the received information of the device class or the received information of the device model name and issues a command of the class of the pointing device (human interface device).

Such a process for confirming what the connected function is is called enumeration.

Although the USB has formally been supported in Windows (registered trademark) 98, there are many apparatuses which support only conventional IEEE1284 such as personal computers before the release of Windows (registered trademark) 98, apparatuses other than the personal computers, and the like. Therefore, if the printer supports both of the USB and IEEE1284 until the USB is widely spread, it benefits the user. FIG. 4 shows a constructional diagram of a printer having both of the USB and IEEE1284. In FIG. 4, in the case of printing via IEEE1284, print data and a print command which are sent from an upper apparatus are stored from an IEEE1284 cable 115 into a buffer 113 via an IEEE1284 I/F 106, a USB/IEEE selector 107, and a buffer controller 108. A CPU 101 interprets and modifies the print command and print data stored in the buffer 113 and controls in accordance with the print command in a manner such that a motor controller 110 controls a CRMotor/LFMotor (not shown) via a motor driver 112 and a print head controller 109 controls a print head 111 to output the print data. While printing, the CPU is heavily loaded with interpretation and modification of the print command and print data sent from the upper apparatus, motor control, and print head control. When the USB cable is connected and the foregoing enumeration is started during the printing, the CPU is burdened with the enumeration, so that there is a possibility of occurrence of 1) decrease in printing speed
2) impossibility of enumeration Particularly, in the case of a printer of a low price, a cheap CPU whose processing ability is low is often used, so that such a possibility increases.

SUMMARY OF THE INVENTION

According to the invention, means for pulling up one of two signal lines of the USB or disconnecting the pull-up is used, when a USB cable is connected or a power source of a host is turned on during printing by IEEE1284, the USB signal line is not pulled up until the end of the printing by IEEE1284, it is pulled up after completion of the printing, and the USB enumeration is executed.

DETAILED DESCRIPTION OF THE PREFERRED EMBODIMENT

Figure 1:
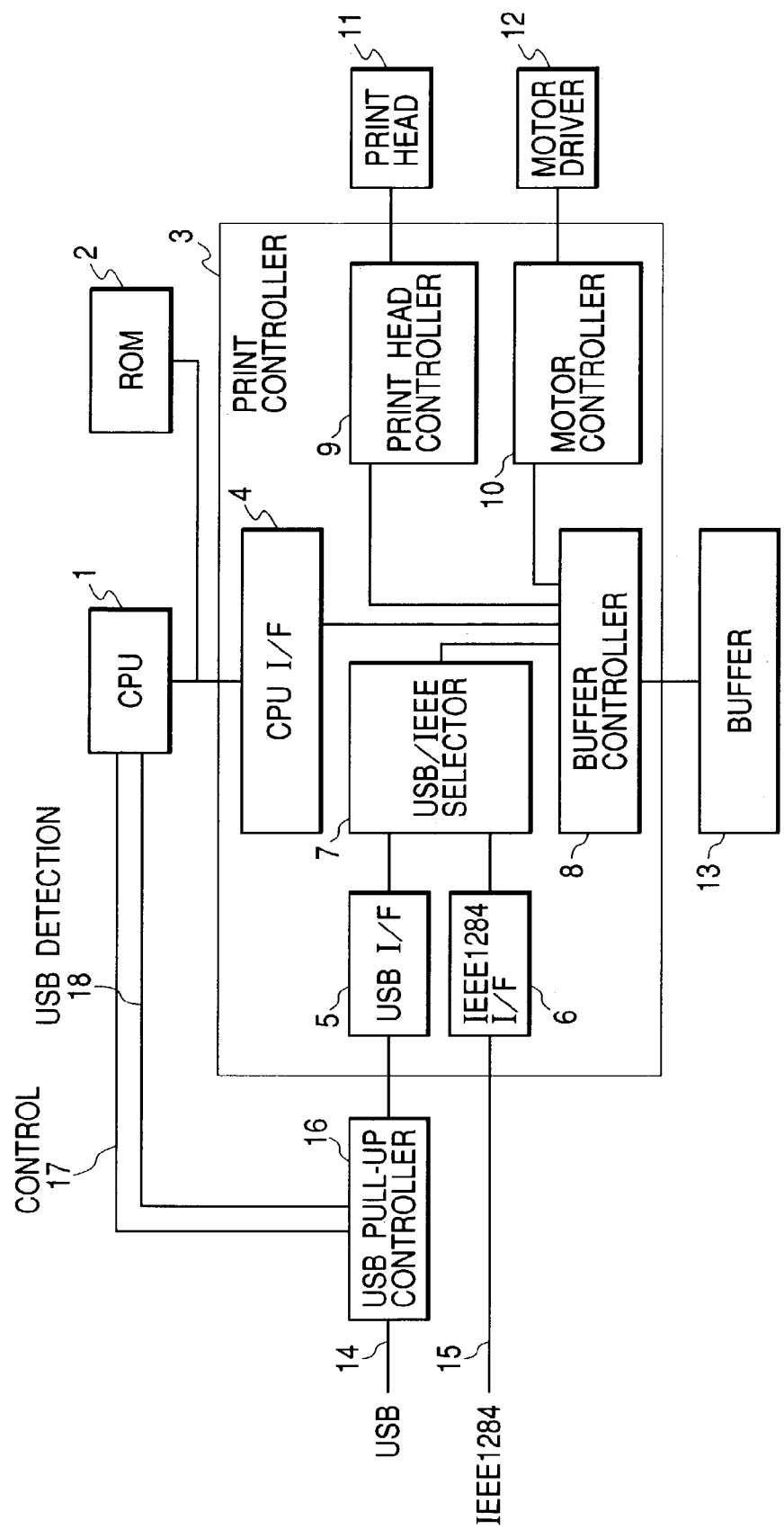
FIG. 1 is a block diagram showing an embodiment of the invention.

FIG. 1 is a block diagram showing an embodiment of the invention.

Figure 2:
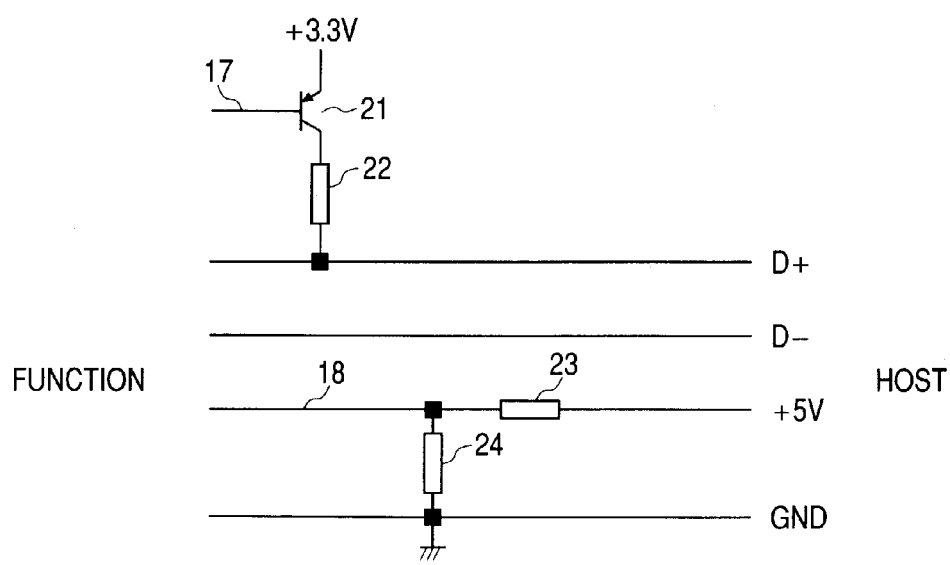
FIG. 2 is a constructional diagram showing USB pull-up control.
Figure 3:
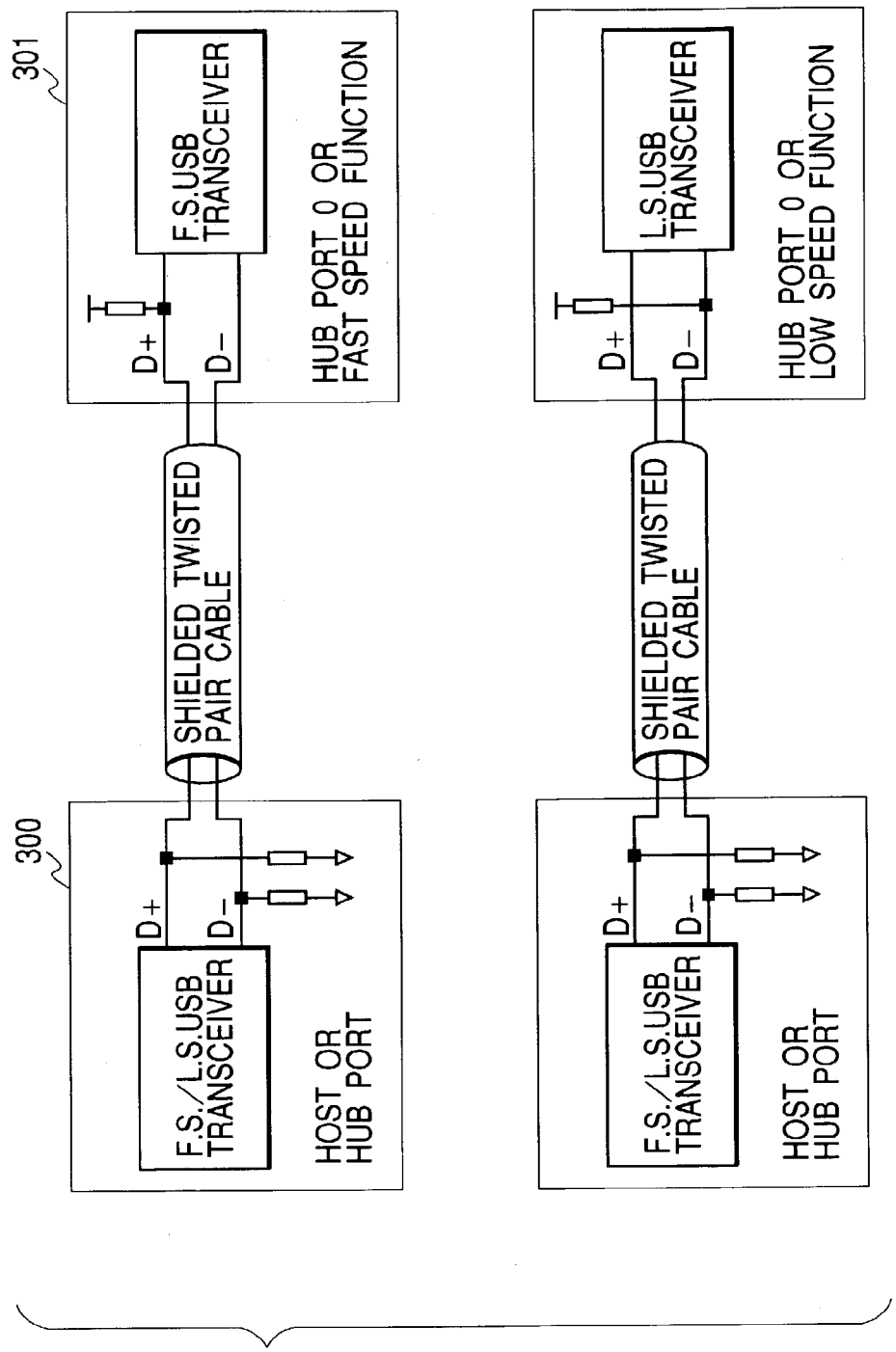
FIG. 3 is a constructional diagram showing a USB termination.
Figure 4:
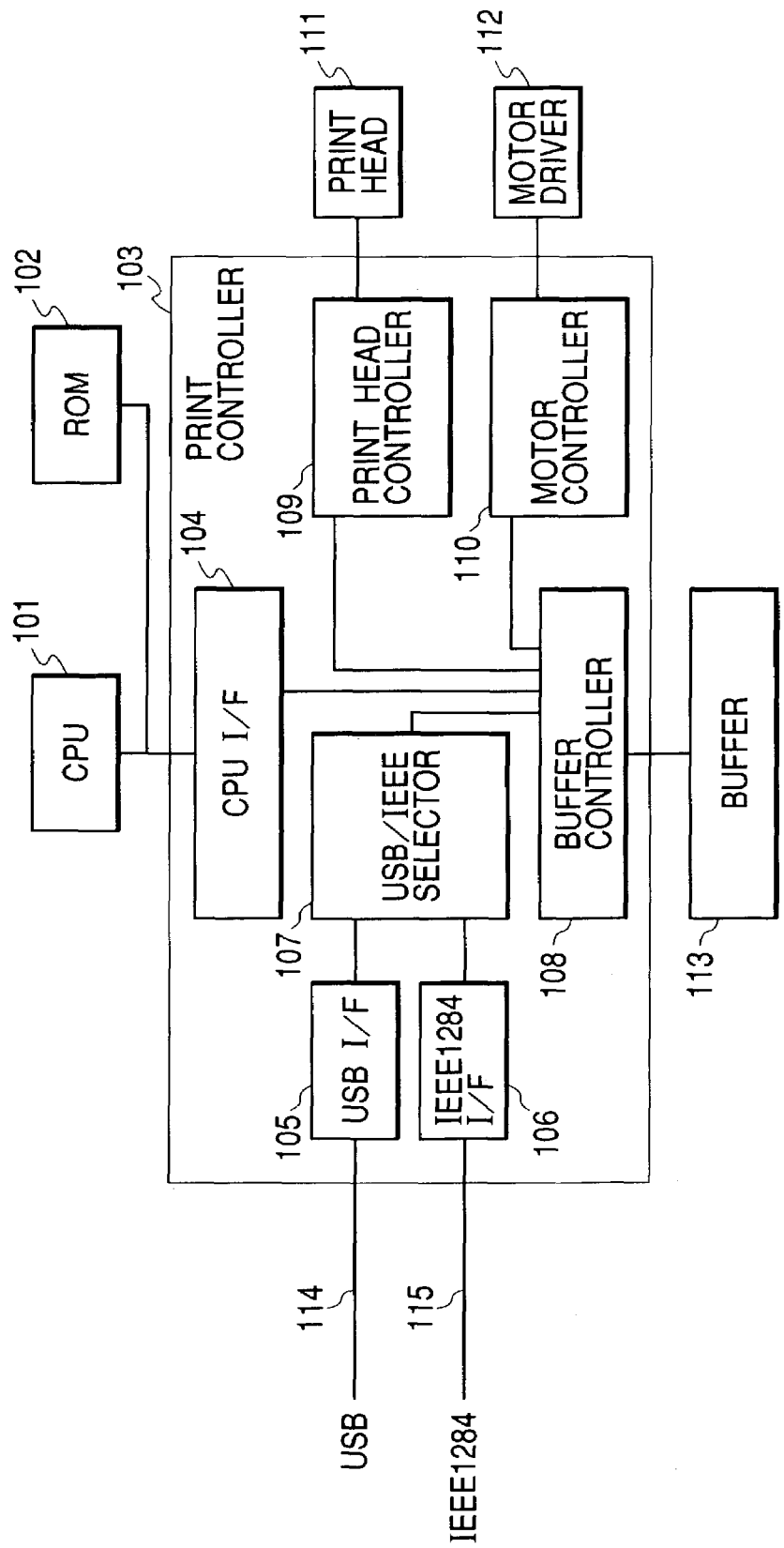
FIG. 4 is a block diagram showing a conventional example.

In FIG. 1, reference numeral 1 denotes a CPU; 2 a ROM; 3 a print controller; 4 a CPU I/F; 5 a USB I/F; 6 an IEEE1284 I/F; 7 a selector for switching the USB and IEEE1284; 8 a buffer controller; 9 a print head controller; 10 a motor controller; 11 a print head; 12 a motor driver; 13 a buffer; 14 a USB cable; 15 an IEEE1284 cable; 16 a USB pull-up controller; 17 a control signal; and 18 a USB cable detection signal. FIG. 2 is a constructional diagram showing a USB pull-up control block. In FIG. 2, reference numeral 21 denotes a high side switch; 22 a pull-up resistor; and 23 and 24 resistors for detecting and dividing a voltage from a host.

The embodiment will now be described with reference to FIGS. 1 and 2.

Upon printing on the basis of data sent from IEEE1284, the print data passes through the IEEE1284 cable 15, IEEE1284 I/F 6, and selector 7 and is temporarily stored into the buffer 13 via the buffer controller 8. The CPU 1 modifies the data stored in the buffer and controls in a manner such that the print head controller 9 outputs the print data from the print head 11 and prints it onto a print medium. During the printing, the CPU 1 controls-a series of print data and controls a CR/LF motor (not shown) via the motor controller 10 and the motor driver 12.

When the host and the printer are connected via the USB I/F cable and a voltage of +5V is supplied from the host, the voltage from the host is divided by the voltage dividing resistors 23 and 24 and supplied to the CPU 1 via the USB cable detection signal 18. At this point of time, the CPU 1 can recognize that the USB cable has been connected and the host is active. The CPU 1 discriminates whether the printer upon the recognition is in a status of "under printing by IEEE1284". If it is determined as a result of the discrimination that the printer status is not "under printing by IEEE1284", the CPU 1 turns on the high side switch 21 via the control signal 17. When the high side switch 21 is turned on, since the D+ signal of the USB is pulled up, the host recognizes that the printer is in a communication possible status and starts the USB enumeration. On the contrary, if the discrimination result of the CPU 1 indicates that the printer status is "under printing by IEEE1284", the CPU 1 does not turn on the high side switch 21 but continues the printing from IEEE1284. When the printing is finished, the CPU 1 turns on the high side switch 21 and starts the USB enumeration.

As described above, when the USB I/F is activated, by pulling up the USB signal in accordance with the printer status, the enumeration under printing by IEEE1284 can be avoided.

Although the embodiment has been described mainly with respect to the printer, naturally, the functions mentioned in the embodiment can be also applied to information apparatuses other than the printer.

What is claimed is:

1. A printer comprising:
   a recognizing unit adapted to recognize that USB interface cable has been connected and that a host is active;
   a discriminating unit adapted to discriminate whether printing is being executed through another interface other than a USB interface, upon recognition by said recognizing unit that the USB interface cable has been connected and that the host is active; and
   a processing unit adapted to, if it is determined by said discriminating unit that the printing is being executed through the other interface, start a USB enumeration when the printing through the other interface is finished, and, if it is determined by said discriminating unit that the printing is not being executed through the other interface, start the USB enumeration,
   wherein if it is determined by said discriminating unit that the printing is being executed through the other interface, said processing unit does not turn on a high side switch and turns on the high side switch and starts the USB enumeration when the print through the other interface is finished, and if it is determined by said discriminating unit that the printing is not being executed through the other interface, said processing unit turns on the high side switch and starts the USB enumeration.

2. A printer according to claim 1, wherein the other interface comprises an IEEE 1284 interface.

3. A printer according to claim 1, further comprising a printing unit adapted for printing data received through the other interface.

4. A control method of an interface, comprising:
   a recognizing step of recognizing that a USB interface cable has been connected and that a host is active;
   a discriminating step of discriminating whether printing is being executed through another interface other than a USB interface, upon recognition in said recognizing step that the USB interface cable has been connected and that the host is active; and
   a processing step of, if it is determined by said discriminating step that the printing is being executed through the other interface, starting a USB enumeration when the printing through the other interface is finished, and, if it is determined in said discriminating step that the printing is not being executed through the other interface, starting the USB enumeration,
   wherein if it is determined in said discriminating step that the printing is being executed through the other interface, said processing step does not turn on a high side switch and turns on the high side switch and starts the USB enumeration when the print through the other interface is finished, and if it is determined in said discriminating step that the printing is not being executed through the other interface, said processing step turns on the high side switch and starts the USB enumeration.

5. A control method according to claim 4, wherein the other interface comprises an IEEE 1284 interface.

* * * * *